(12) United States Patent
Ito

(10) Patent No.: US 7,741,739 B2
(45) Date of Patent: Jun. 22, 2010

(54) AUTOMOTIVE ALTERNATOR

(75) Inventor: Shinichi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/604,687

(22) Filed: Nov. 28, 2006

(65) Prior Publication Data

US 2007/0290557 A1 Dec. 20, 2007

(30) Foreign Application Priority Data

Jun. 15, 2006 (JP) ............................. 2006-165662

(51) Int. Cl.
H02K 9/00 (2006.01)

(52) U.S. Cl. ............................. 310/58; 310/52; 310/59; 310/71

(58) Field of Classification Search ................... 310/58, 310/71; H02K 9/00
See application file for complete search history.

(56) References Cited

U.S. PATENT DOCUMENTS

| | | | |
|---|---|---|---|
| 5,977,669 A * | 11/1999 | Yoshida et al. ............ 310/68 D |
| 6,060,802 A * | 5/2000 | Masegi et al. ............. 310/68 D |
| 6,285,110 B1 * | 9/2001 | Tong et al. .................. 310/270 |
| 6,492,752 B2 * | 12/2002 | Ishida ......................... 310/71 |
| 6,515,392 B2 * | 2/2003 | Ooiwa ......................... 310/179 |
| 6,740,995 B2 * | 5/2004 | Oohashi et al. ........... 310/68 D |
| 2001/0022477 A1 * | 9/2001 | Ishida ......................... 310/89 |
| 2004/0256928 A1 * | 12/2004 | Kondo et al. ............. 310/68 D |
| 2006/0097591 A1 * | 5/2006 | Nakano ....................... 310/89 |

FOREIGN PATENT DOCUMENTS

| JP | 2001-298907 A | 10/2001 |
|---|---|---|
| JP | 2002-142423 A | 5/2002 |

* cited by examiner

*Primary Examiner*—Quyen Leung
*Assistant Examiner*—John K Kim
(74) *Attorney, Agent, or Firm*—Sughrue Mion, PLLC

(57) ABSTRACT

A cooling airflow introducing guide portion is disposed on a portion of a connector that faces fins of a voltage regulator heatsink so as to extend in a direction of array of the fins so as to ensure a predetermined clearance relative to the fins. An air intake aperture is disposed through a portion of the rear bracket that faces the voltage regulator heatsink.

2 Claims, 8 Drawing Sheets

AUTOMOTIVE ALTERNATOR

BACKGROUND OF THE INVENTION

1. Field of the Invention

The present invention relates to an automotive alternator that is mounted to a vehicle, and particularly relates to a construction that cools a voltage regulator.

2. Description of the Related Art

In conventional automotive alternators, a rectifier assembly is configured into an approximate C shape, and a voltage regulator, a brush holder, and a connector are configured integrally into a regulator assembly. The voltage regulator and the brush holder are disposed so as to overlap in an axial direction of a shaft, and the connector is disposed at a position that is rotated by a predetermined angle circumferentially from the voltage regulator and the brush holder in a plane that is perpendicular to the shaft and that includes the voltage regulator and the brush holder such that an opening portion faces radially outward. The regulator assembly is disposed in a space in an opening portion of the C shape of the rectifier assembly. Thus, the size of the heatsink of the rectifier is limited by the regulator assembly and cannot be enlarged. Furthermore, ventilation resistance in the connector and ventilation resistance in the voltage regulator differ from each other, and irregularities in ventilation resistance on an intake side that includes the rectifier assembly are great.

In view of these conditions, improved conventional automotive alternators have been proposed that include a regulator assembly in which a voltage regulator and a brush holder are disposed so as to overlap in an axial direction of a shaft, and the connector is disposed in close contact with the voltage regulator radially outside the voltage regulator such that an opening portion faces radially outward (see Patent Literature 1, for example). In these improved conventional automotive alternators, because the regulator assembly is disposed in a space in an opening portion of the rectifier assembly that has a C shape, the heatsink of the rectifier can be made larger, improving cooling of the rectifier. In addition, irregularities in ventilation resistance on the air intake side that includes the rectifier assembly are reduced.

Patent Literature 1: Japanese Patent Laid-Open No. 2002-142423 (Gazette), which corresponds to U.S. Pat. No. 6,740,995 to Oohashi et al.

In improved conventional automotive alternators, the connector is disposed radially outside the voltage regulator in order to improve cooling of the rectifier. The heatsink of the voltage regulator is disposed in a plane that is perpendicular to the shaft such that ventilation channels between the fins are aligned in a radial direction. The connector is placed in close contact with a radially outer side surface of the heatsink of the voltage regulator, and is in a state that blocks radially outer openings of the ventilation channels between the fins. Thus, cooling air does not flow into the ventilation channels between the fins of the heatsink of the voltage regulator satisfactorily, making cooling performance of the heatsink poor and increasing the temperature of the voltage regulator.

SUMMARY OF THE INVENTION

The present invention aims to solve the above problems and an object of the present invention is to provide an automotive alternator that enables performance to be increased by suppressing deterioration of cooling of a voltage regulator that results from improvements in cooling of a rectifier to suppress temperature increases in the rectifier and the voltage regulator.

In order to achieve the above object, according to one aspect of the present invention, there is provided an automotive alternator including: a case; a shaft that is rotatably supported by the case; a rotor that is accommodated inside the case and that has: a pole core that is fixed to the shaft; a field winding that is mounted to the pole core; and at least one centrifugal fan that is fixed to an axial end of the pole core; a stator that is fixed to the case so as to surround the rotor; a voltage regulator that adjusts magnitude of an alternating voltage that is generated in the stator; a voltage regulator heatsink that is disposed on an opposite side of the voltage regulator from the centrifugal fan; and a connector that is disposed on an outer circumferential side of the voltage regulator and to which an external plug can be mounted. A plurality of air intake apertures are formed on a side of the case that faces the centrifugal fan and a plurality of fins are arrayed circumferentially on a side of the voltage regulator heatsink that faces the case. The automotive alternator is characterized in that a cooling airflow introducing guide portion is disposed on a portion of the connector that faces the voltage regulator heatsink.

According to the present invention, because the connector is positioned on an outer circumferential side of the voltage regulator, installation regions for the rectifier and the rectifier heatsink are enlarged, suppressing temperature increases in the rectifier. Cooling airflow that has flowed in through the air intake apertures enters the ventilation channels between the fins of the voltage regulator heatsink. A portion of the cooling airflow flows radially inward through the ventilation channels. A remaining portion of the cooling airflow flows radially outward through the ventilation channels, and then flows circumferentially between the fins and the cooling airflow introducing guide portion. Thus, because the cooling airflow flows through the entire radial length of the ventilation channels between the fins and absorbs heat generated in the voltage regulator efficiently, temperature increases in the voltage regulator can be suppressed.

DETAILED DESCRIPTION OF THE PREFERRED EMBODIMENT

Figure 1:
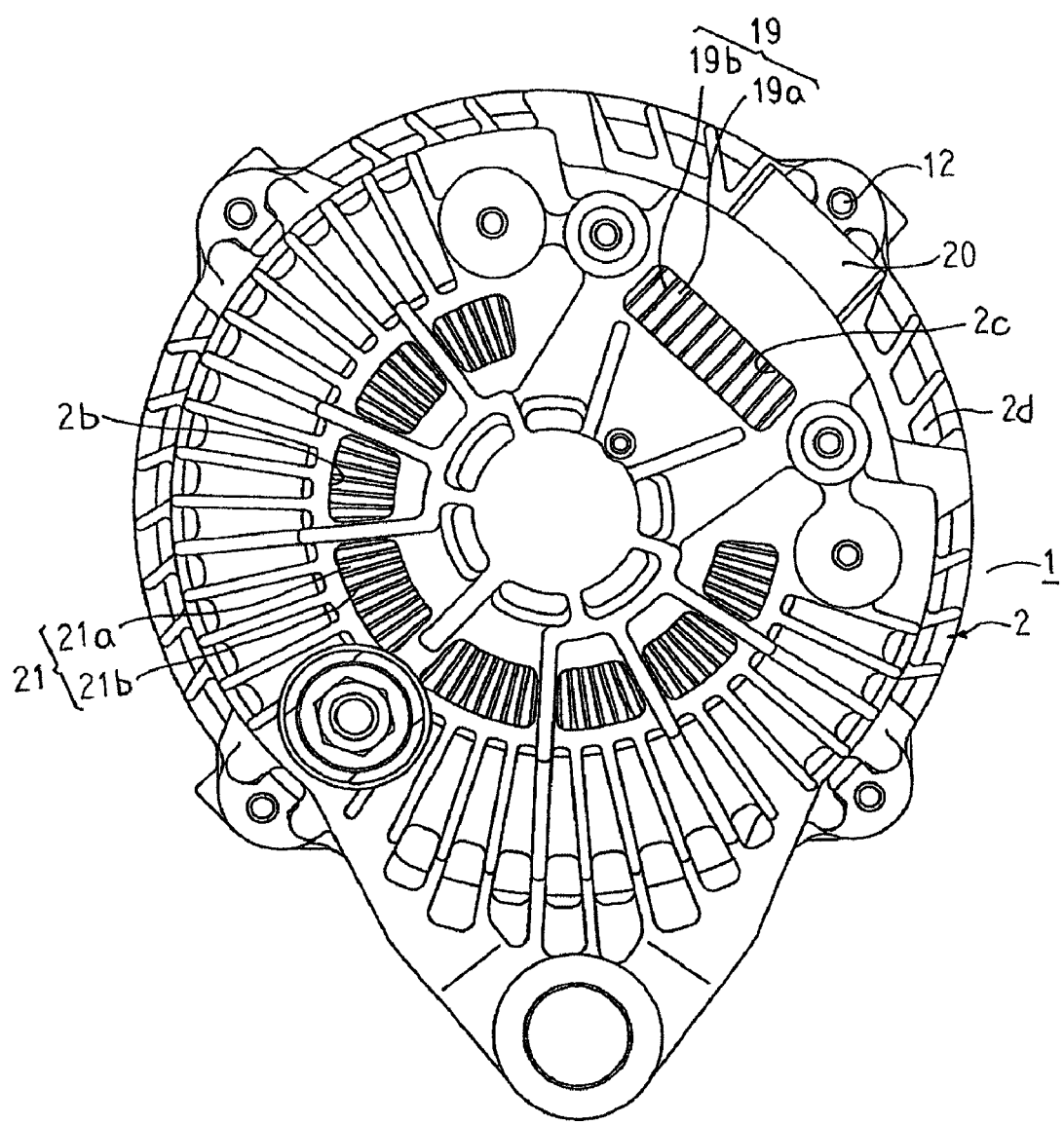
FIG. 1 is a view from a rear end of an automotive alternator according to a preferred embodiment of the present invention.
Figure 2:
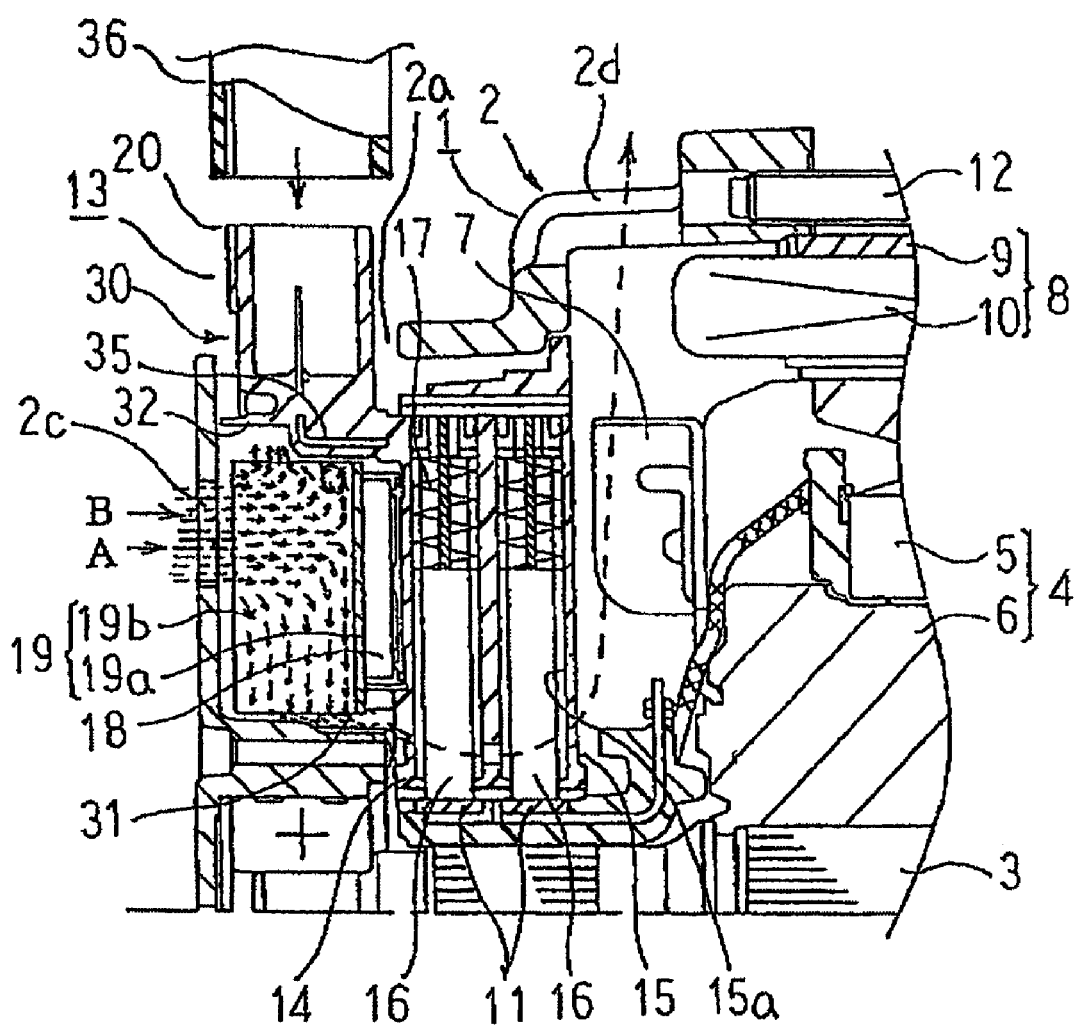
FIG. 2 is a cross section of part of the automotive alternator according to the preferred embodiment of the present invention.
Figure 3:
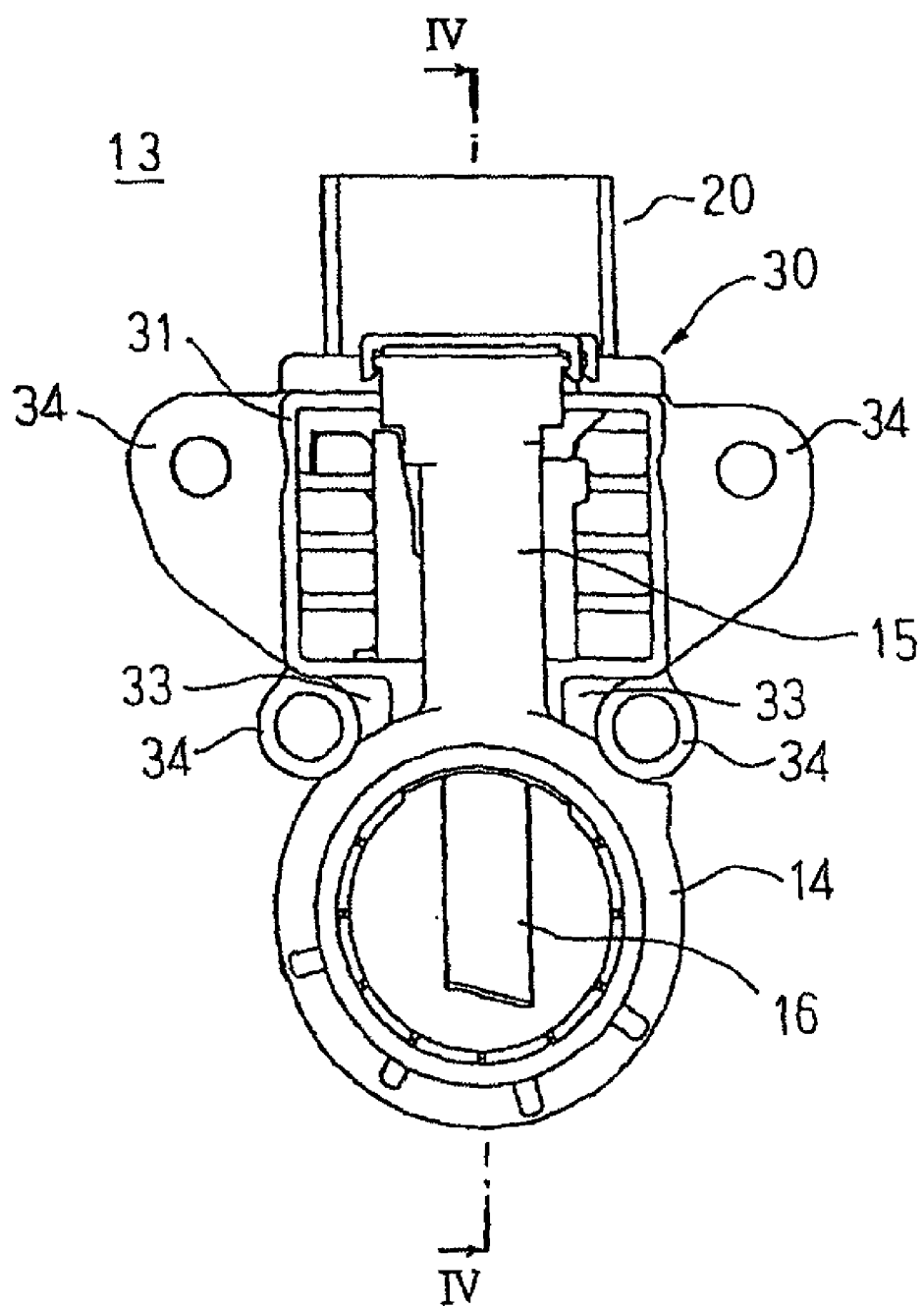
FIG. 3 is a front elevation of a regulator assembly that can be used in the automotive alternator according to the preferred embodiment of the present invention.
Figure 4:
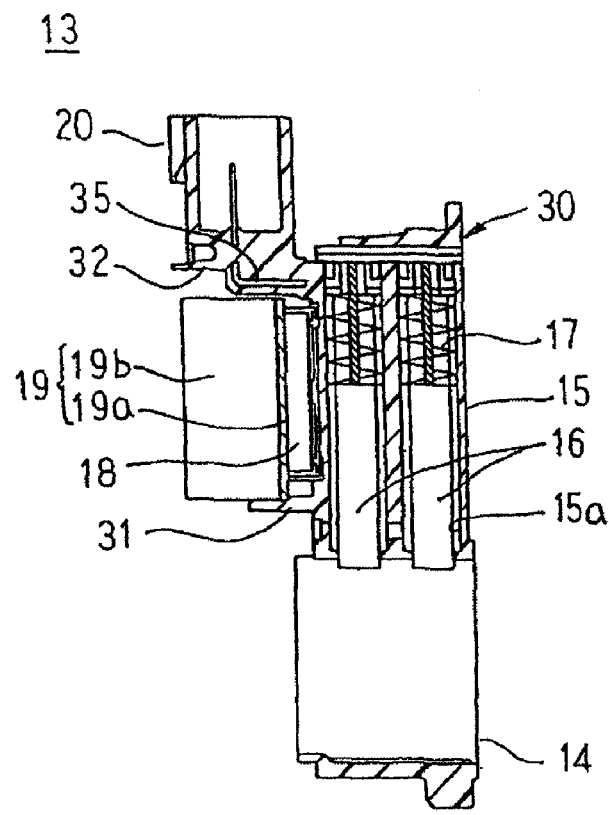
FIG. 4 is a cross section taken along line IV-IV in FIG. 3 viewed from the direction of the arrows.
Figure 5:
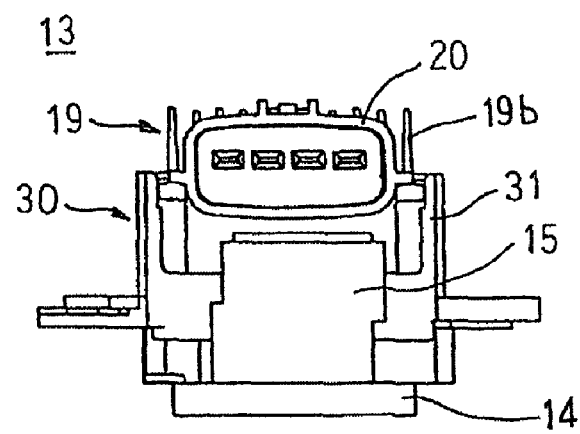
FIG. 5 is a view of the regulator assembly that can be used in the automotive alternator according to the preferred embodiment of the present invention from a side near a connector opening portion.
Figure 6:
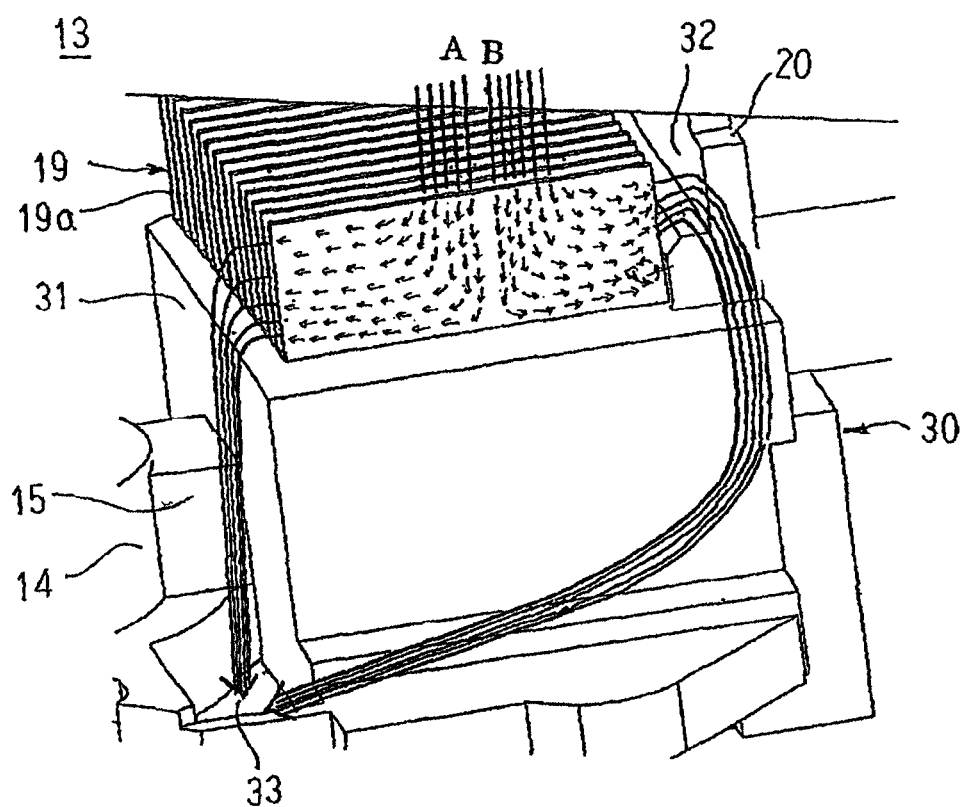
FIG. 6 is a partial perspective for explaining cooling airflows in the automotive alternator according to the preferred embodiment of the present invention.
Figure 7:
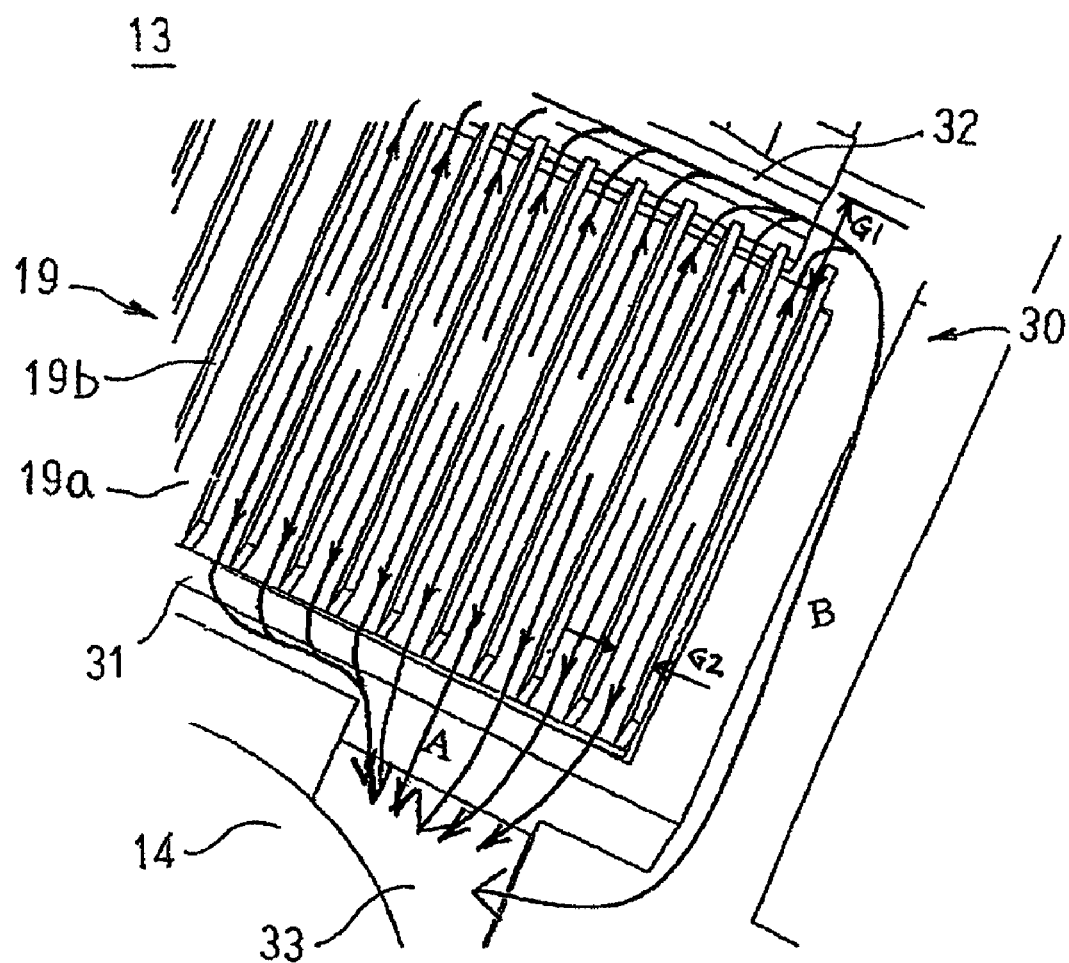
FIG. 7 is a partial perspective for explaining the cooling airflows in the automotive alternator according to the preferred embodiment of the present invention.

FIG. 1 is a view from a rear end of an automotive alternator according to a preferred embodiment of the present invention, FIG. 2 is a cross section of part of the automotive alternator according to the preferred embodiment of the present invention, FIG. 3 is a front elevation of a regulator assembly that can be used in the automotive alternator according to the preferred embodiment of the present invention, FIG. 4 is a cross section taken along line IV-IV in FIG. 3 viewed from the direction of the arrows, FIG. 5 is a view of the regulator assembly that can be used in the automotive alternator according to the preferred embodiment of the present invention from a side near a connector opening portion, and FIGS. 6 and 7 are each partial perspectives for explaining cooling airflows in the automotive alternator according to the preferred embodiment of the present invention.

In FIGS. 1 and 2, an automotive alternator includes: a case 1 that is constituted by a front bracket (not shown) and a rear bracket 2 that are each approximately bowl-shaped and made of aluminum; a shaft 3 that is rotatably supported by the case 1; a rotor 4 that is fixed to the shaft 3 so as to be rotatably disposed inside the case 1; centrifugal fans 7 that are fixed to two axial end surfaces of the rotor 4; a stator 8 that is held by the case 1 so as to surround the rotor 4; a pair of slip rings 11 that are fixed to a rear-end end portion of the shaft 3 so as to supply field current to the rotor 4; a rectifier (not shown) that is electrically connected to the stator 8 so as to rectify alternating current that is generated in the stator 8 into direct current; and a regulator assembly 13.

The rotor 4 includes: a rotor coil 5 functioning as a field winding that generates magnetic flux on passage of electric current; and a pole core 6 that is disposed so as to cover the rotor coil 5 such that magnetic poles are formed by the magnetic flux. The stator 8 includes: a stator core 9; a stator coil 10 that is installed in the stator core 9 such that alternating current arises due to changes in the magnetic flux from the rotor coil 5 accompanying rotation of the rotor 4. This stator 8 is disposed so as to surround the rotor 4, and is mounted such that outer circumferential edge portions of two axial end surfaces of the stator core 9 are held under pressure by the front bracket and the rear bracket 2, which are fastened using fastening bolts 12.

Next, configuration of the regulator assembly 13 will be explained with reference to FIGS. 3 through 5.

The regulator assembly 13 includes: a ring-shaped slinger 14 through which the shaft 3 is inserted; a brush holder 15 that is disposed so as to extend radially outward from an outer circumferential wall surface of the slinger 14 and that is formed such that a brush insertion aperture 15a that has an aperture direction in a radial direction is open at an inner circumferential wall surface of the slinger 14; a pair of brushes 16 that are inserted inside the brush insertion aperture 15a so as to line up in an axial direction of the slinger 14 and be movable radially; springs 17 that are disposed inside the brush insertion aperture 15a so as to force the pair of brushes 16 toward the slinger 14; a voltage regulator 18 that is disposed on a first side of the brush holder 15 in an axial direction of the slinger 14 and that adjusts magnitude of an alternating voltage that is generated in the stator 8; and a connector 20 to which an external plug 36 is mounted so as to input a field current that is supplied to the rotor coil 5 through the brushes 16 and the slip rings 11 from outside.

The slinger 14, the brush holder 15, and the connector 20 are constituted by a resin body 30 that is molded integrally using an insulating resin such as a polyphenylene sulfide (PPS) resin, etc., for example. In this resin body 30, a voltage regulator housing portion 31 is formed on the first side of the brush holder 15 in the axial direction of the slinger 14, and the connector 20 is formed radially outside the voltage regulator housing portion 31 on the first side of the brush holder 15 in the axial direction of the slinger 14. A cooling airflow introducing guide portion 32 is formed alongside the voltage regulator housing portion 31 on a wall surface of the connector 20 near the voltage regulator housing portion 31 so as to have a predetermined clearance. In addition, ventilating apertures 33 are formed on first and second circumferential sides of a coupled portion between the slinger 14 and the brush holder 15 so as to penetrate through the resin body 30 in the axial direction of the slinger 14. A plurality of mount portions 34 are also formed integrally on the resin body 30. Insert conductors 35 are insert molded into the resin body 30 so as to establish electrical continuity among the component parts.

A voltage regulator heatsink 19 includes: a flat, rectangular base portion 19a; and a plurality of fins 19b that are disposed upright on a first surface of the base portion 19a so as to be arrayed at a predetermined pitch. The voltage regulator 18 is fixed to a second surface of the base portion 19a of the voltage regulator heatsink 19. This voltage regulator heatsink 19 is fitted onto the voltage regulator housing portion 31 so as to house the voltage regulator 18 inside the voltage regulator housing portion 31. Here, ventilation channels between the fins 19b extend in a radial direction of the slinger 14. The cooling airflow introducing guide portion 32 is formed so as to have a surface shape that faces a radially-outer side surface of all of the fins 19b so as to have a predetermined clearance. Moreover, the cooling airflow introducing guide portion 32 faces approximately half of a region of the ventilation channels between the fins 19b in a depth direction, as shown in FIG. 4, but may also be formed so as to face the entire region of the ventilation channels between the fins 19b in the depth direction. As shown in FIG. 7, the clearance G1 between the cooling airflow introducing guide portion 32 and the fins 19b is greater than the clearance G2 between the fins 19b.

A regulator assembly 13 that is configured in this manner is mounted by inserting the rear-end end portion of the shaft 3 into the slinger 14 such that the brush holder 15 faces toward the rotor 4, and fastening the mount portions 34 to inner wall surfaces of the rear bracket 2 using mounting screws (not shown). At this time, the slip rings 11 are positioned inside the slinger 14, and the pair of brushes 16 that are housed inside the brush insertion aperture 16a are pressed onto the respective slip rings 11 by the springs 17. The connector 20 extends outward through a connector insertion aperture 2a that is disposed through the rear bracket 2.

The rectifier is mounted to inner wall surfaces of the rear bracket 2 so as to be fastened by mounting screws, and the regulator assembly 13 is accommodated in a space in an opening portion of the C shape of the rectifier. Thus, the regulator assembly 13 and the rectifier are disposed in an annular shape in a plane that is perpendicular to a central axis of the shaft 3.

A rectifier heatsink 21 includes: a flat base portion 21a that has a C-shaped external shape; and fins 21b that are disposed so as to stand in a radial pattern at a predetermined pitch on a first surface of the base portion 21a. The base portion 21a of the rectifier heatsink 21 is disposed in a C shape in a plane that is perpendicular to a central axis of the shaft 3 such that the fins 21b face the rear bracket 2. As shown in FIG. 1, a plurality of arc-shaped air intake apertures 2b are disposed through an end surface of the rear bracket 2 so as to be arrayed in a C shape so as to face the base portion 21a and the fins 21b of the rectifier heatsink 21 and expose a radially central region of the rectifier heatsink 21. A rectangular air intake aperture 2c is disposed through the end surface of the rear bracket 2 so as to face the base portion 19a and the fins 19b of the voltage regulator heatsink 19 and expose a radially central region of the voltage regulator heatsink 19. In addition, a plurality of air discharge apertures 2d are disposed through a side surface of the rear bracket 2.

In an automotive alternator that is configured in this manner, electric current is first supplied from a battery (not shown) through the brushes 16 and the slip rings 11 to the rotor coil 5 of the rotor 4, generating magnetic flux. Some claw-shaped magnetic poles in the pole core 6 are magnetized into North-seeking (N) poles by this magnetic flux, and other claw-shaped magnetic poles in the pole core 6 are magnetized into South-seeking (S) poles. At the same time, rotational torque from an engine is transmitted from an output shaft of the engine through a belt and a pulley to the shaft 3, rotating the rotor 4. Thus, a rotating magnetic field is applied to the stator coil 10 of the stator 8, generating an electromotive force in the stator coil 10. This alternating-current electromotive force is rectified into direct current by the rectifier so as to charge the battery and be supplied to an electric load, etc. Magnitude of the alternating voltage that is generated in the stator 8 is also adjusted by the voltage regulator 18.

The centrifugal fans 7 are rotated together with the rotation of the rotor 4. Thus, at the rear end, for example, a cooling airflow is sucked inside the rear bracket 2 through the air intake apertures 2b. This cooling airflow flows radially inward through the ventilation channels between the fins 21b of the rectifier heatsink 21 to a vicinity of the shaft 3, and then flows toward the rotor 4 in the vicinity of the shaft 3. The cooling airflow that has flowed to the rotor 4 is deflected centrifugally by the centrifugal fans 7 and is discharged through the air discharge apertures 2d. Thus, heat that is generated by the rectifier is absorbed into the cooling airflow that flows through the ventilation channels between the fins 21b, suppressing temperature increases in the rectifier.

Similarly, a cooling airflow A is sucked inside the rear bracket 2 through the air intake aperture 2c due to the rotation of the centrifugal fans 7. This cooling airflow A flows radially inward through the ventilation channels between the fins 19b of the voltage regulator heatsink 19, as indicated by the arrows in FIGS. 2, 6, and 7. The cooling airflow A flows radially inward from the ventilation channels between the fins 19b, and flows along an outer wall surface on a radially inner side of the voltage regulator housing portion 31 to the ventilating apertures 33. A cooling airflow B flows radially outward through the ventilation channels between the fins 19b of the voltage regulator heatsink 19, and flows radially outward from the ventilation channels, as indicated by the arrows in FIGS. 2, 6, and 7. The cooling airflow B that has flowed out strikes the cooling airflow introducing guide portion 32, flows circumferentially between the voltage regulator heatsink 19 and the cooling airflow introducing guide portion 32, and then flows along a circumferentially outer wall surface of the voltage regulator housing portion 31 to the ventilating apertures 33. The cooling airflows A and B then merge and flow through the ventilating apertures 33 toward the rotor 4. The cooling airflows A and B that have flowed to the rotor 4 are deflected centrifugally by the centrifugal fans 7 and are discharged through the air discharge apertures 2d. Thus, heat that is generated by the voltage regulator 18 is absorbed into the cooling airflows A and B that flow through the ventilation channels between the fins 19b, suppressing temperature increases in the voltage regulator 18.

Next, positional relationships between the air intake aperture 2c and the voltage regulator heatsink 19 will be explained with reference to FIGS. 8 and 9. Moreover, FIG. 8 is a partial perspective that shows a vicinity of an air intake aperture in an automotive alternator according to one variation of the present invention, and FIG. 9 is a partial perspective that explains cooling airflows in the automotive alternator according to one variation of the present invention.

Figure 8:
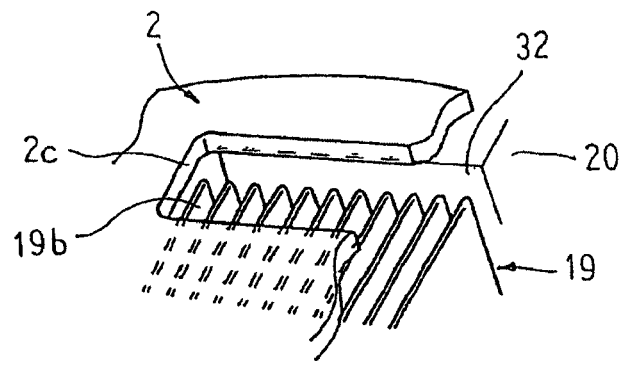
FIG. 8 is a partial perspective that shows a vicinity of an air intake aperture in an automotive alternator according to one variation of the present invention.
Figure 9A:
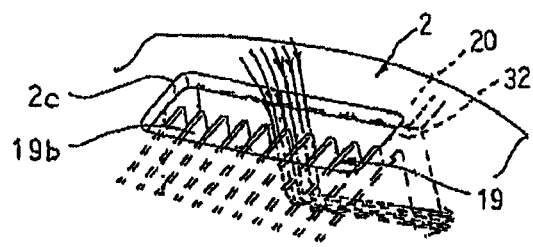
FIGS. 9A and 9B are a partial perspective view and a side view, respectively, that explain cooling airflows in the automotive alternator according to one variation of the present invention.
Figure 9B:
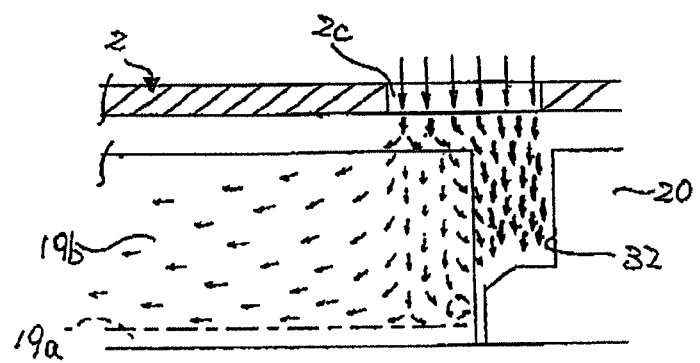

In the automotive alternator that is shown in FIG. 8, the rectangular air intake aperture 2c is disposed through the rear bracket 2 so as to expose radially outermost ends of the fins 19b of the voltage regulator heatsink 19 when viewed from the rear end. In other words, the outer radial end portion of the air intake aperture 2c is positioned radially outside the outer radial end portions of the fins 19b of the voltage regulator heatsink 19. Ventilation resistance in the ventilation channels between the fins 19b is greater than ventilation resistance between the voltage regulator heatsink 19 (the fins 19b) and the cooling airflow introducing guide portion 32. Thus, the cooling airflow that flows in through the air intake aperture 2c is more likely to flow between the voltage regulator heatsink 19 and the cooling airflow introducing guide portion 32, and mainly flows along the flow channel that are indicated by the arrows in FIG. 9. In other words, a large portion of the cooling airflow flows circumferentially between the voltage regulator heatsink 19 and the cooling airflow introducing guide portion 32 without entering between the fins 19b, and then flows along a circumferentially outer wall surface of the voltage regulator housing portion 31 to the ventilating apertures 33. Thus, the voltage regulator heatsink 19 is not utilized effectively, reducing cooling of the voltage regulator 18.

Thus, it is desirable to position the outer radial end portion of the air intake aperture 2c radially inside the outer radial end portions of the fins 19b (the outermost radial position of the voltage regulator heatsink 19) and to form the air intake aperture 2c so as to have an aperture shape that exposes the radially central region of the fins 19b of the voltage regulator heatsink 19 when viewed from the rear end such that the cooling airflow that has flowed in through the air intake aperture 2c is forcibly made to flow into the ventilation channels between the fins 19b. Furthermore, the center of the region of the heatsink 19 that is exposed through the air intake aperture 2c is not limited to the radial center of the heatsink 19 and may be offset in one direction radially.

If the air intake aperture 2c is made to have an aperture shape that exposes the fins 19b at two circumferential ends of the voltage regulator heatsink 19 when viewed from the rear end, improved cooling performance can be achieved because the cooling airflow flows outside the fins 19b at the two circumferential ends and heat exchange is performed with those fins 19b. Cooling can also be improved if the fins 19b at one circumferential end are positioned inside the air intake aperture 2c.

Next, the effect of the cooling airflow introducing guide portion 32 will be explained. Moreover, FIG. 10 is a partial perspective that shows a vicinity of an air intake aperture in an automotive alternator that functions as a comparative example, and FIG. 11 is a partial perspective that explains cooling airflows in the automotive alternator that functions as a comparative example.

Figure 10:
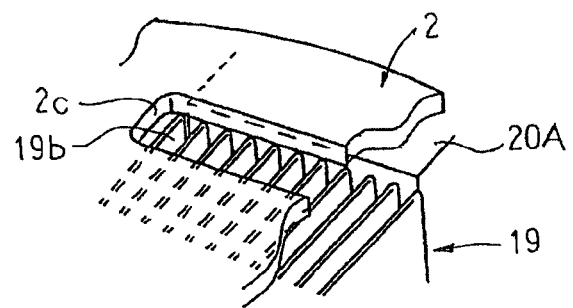
FIG. 10 is a partial perspective that shows a vicinity of an air intake aperture in an automotive alternator that functions as a comparative example.
Figure 11A:
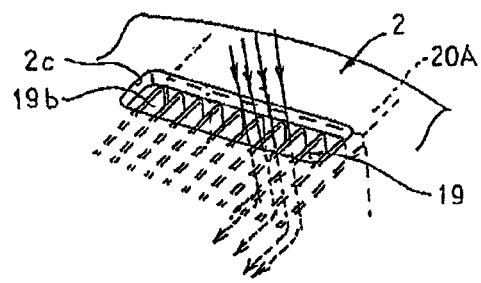
FIGS. 11A and 11B are a partial perspective view and a side view, respectively, that explain cooling airflows in the automotive alternator that functions as a comparative example.
Figure 11B:
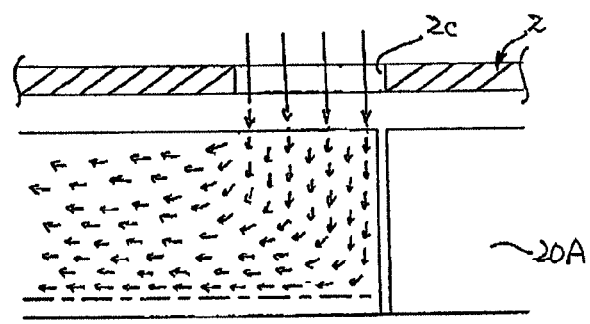

In the comparative example that is shown in FIG. 10, a radially inner wall surface of a connector 20A is in close contact with radially outer side surfaces of all of the fins 19b of the voltage regulator heatsink 19. Thus, the cooling airflow that has flowed in through the air intake aperture 2c enters the ventilation channels between the fins 19b and flows radially inward and outward through the ventilation channels. Here, the cooling airflow that flows radially outward through the ventilation channels is blocked by the wall surface of the connector 20A and cannot flow out of the ventilation channels. In other words, as indicated by arrows in FIG. 11, the cooling airflow flows radially inward through the ventilation channels but cannot flow radially outward through the ventilation channels.

In the present invention, because the cooling airflow introducing guide portion 32 is formed so as to face the radially outer side surfaces of all of the fins 19b of the voltage regulator heatsink 19 while ensuring a predetermined clearance and lying parallel to those side surfaces, the radially outer ends of the ventilation channels between the fins 19b are open. Thus, in addition to a flow channel for a cooling airflow to flow in through the air intake aperture 2c, enter the ventilation channels between the fins 19b, and flow radially inward through the ventilation channels, a flow channel is also configured for a cooling airflow to flow radially outward through the ventilation channels. It has thereby become possible to improve heat radiating performance of the voltage regulator heatsink 19 by more than 3 percent compared with the above comparative example.

Thus, according to the present invention, because the voltage regulator housing portion 31 is formed on a first side of the brush holder 15 in the axial direction of the slinger 14, and the connector 20 is formed radially outside the voltage regulator housing portion 31 on the first side of the brush holder 15 in the axial direction of the slinger 14, circumferential width of the regulator assembly 13 can be reduced, enabling the circumferential width of the rectifier to be increased proportionately. Consequently, the rectifier heatsink 21 can be configured so as to have a large heat radiating area, enabling cooling of the rectifier to be improved.

The cooling airflow introducing guide portion 32 is formed on the resin body 30 so as to face the radially outer side surfaces of all of the fins 19b of the voltage regulator heatsink 19 while ensuring a predetermined clearance and lying parallel to those side surfaces, in other words, on a portion of the connector 20 that faces the voltage regulator heatsink 19. Thus, the cooling airflow A that has flowed in through the air intake aperture 2c flows radially inward through the ventilation channels between the fins 19b, and the cooling airflow B flows radially outward through the ventilation channels between the fins 19b. Thus, heat exchange with the cooling airflows is performed radially throughout the ventilation channels between the fins 19b, enabling cooling of the voltage regulator 18 to be improved.

Moreover, in the above embodiment, the fins 19b are formed on one surface of the base portion 19a so as to be arrayed parallel to each other, but the fins 19b may also be formed on one surface of the base portion 19a so as to be arrayed in a radial pattern. In that case, the voltage regulator heatsink 19 can be disposed such that the fins 19b in the radial pattern are aligned in a radial direction.

In the above embodiment, the slinger 14, the brush holder 15, the connector 20, and the voltage regulator housing portion 31 are molded integrally into the resin body 30, but the connector 20 and the voltage regulator housing portion 31 may also be molded together as a separate resin-molded part from the brush holder 15.

What is claimed is:

1. An automotive alternator comprising:
   a case;
   an axially extending shaft that is rotatably supported by said case;
   a rotor that is accommodated inside said case and that has:
      a pole core that is fixed to said shaft;
      a field winding that is mounted to said pole core; and
      at least one centrifugal fan that is fixed to an axial end of said pole core;
   a stator that is fixed to said case so as to surround said rotor;
   a voltage regulator that adjusts magnitude of an alternating voltage that is generated in said stator;
   a voltage regulator heatsink that has a base portion and a plurality of fins that are disposed upright on a first surface of the base portion of said voltage regulator so as to be arrayed circumferentially at a predetermined pitch; and
   a connector that is disposed on an outer circumferential side of said voltage regulator and to which an external plug can be mounted,
   a plurality of cooling air intake apertures being formed on a side of said case that faces said centrifugal fan, and said voltage regulator being disposed such that said plurality of fins faces said case,
   wherein a cooling airflow introducing guide portion is disposed on a portion of said connector, faces radially-outer side surfaces of said fins of said voltage regulator heatsink, and forms a clearance between said cooling airflow introducing guide portion and said voltage regulator heatsink,
   wherein said clearance between said cooling airflow introducing guide portion and said voltage regulator heatsink is greater than that between said fins, and
   an outermost radial position of said voltage regulator heatsink is positioned radially outside said cooling air intake apertures,
   whereby a portion of the cooling airflow flows radially inward through between said fins, and a remaining portion of the cooling airflow flows radially outward between said fins, and then flows circumferentially between said fins and said cooling airflow introducing guide portion.

2. An automotive alternator according to claim 1, wherein said fins on one or both circumferential ends of said voltage regulator heatsink are disposed so as to be positioned inside said cooling air intake apertures.

* * * * *